United States Patent [19]

Kitamura et al.

[11] Patent Number: 4,551,516

[45] Date of Patent: Nov. 5, 1985

[54] COATING COMPOSITION AND THE USE THEREOF

[75] Inventors: Kazuo Kitamura, Otsu; Mitsuru Suezawa, Shiga, both of Japan

[73] Assignee: Toray Industries, Inc., Tokyo, Japan

[21] Appl. No.: 495,578

[22] Filed: May 17, 1983

[51] Int. Cl.[4] .............................................. C08G 77/06
[52] U.S. Cl. ....................................... 528/18; 528/15; 528/19; 528/901; 528/33; 528/34; 524/731
[58] Field of Search .................. 524/731; 528/901, 33, 528/34, 19, 18, 15

[56] References Cited

U.S. PATENT DOCUMENTS

| 3,364,161 | 1/1968 | Nadler | 524/731 |
| 3,647,725 | 3/1972 | Nitzsche et al. | 528/42 |
| 3,865,759 | 2/1975 | Smith | 528/901 |
| 4,147,855 | 4/1979 | Schiller et al. | 528/901 |
| 4,191,817 | 3/1980 | Schiller et al. | 528/901 |
| 4,218,359 | 8/1980 | Marwitz et al. | 528/901 |
| 4,229,548 | 10/1980 | Sattlegger et al. | 528/901 |
| 4,257,932 | 3/1981 | Beers | 528/901 |
| 4,356,116 | 10/1982 | Beers | 524/731 |
| 4,410,677 | 10/1983 | Lampe | 524/731 |
| 4,419,484 | 12/1983 | Sattlegger et al. | 524/731 |

Primary Examiner—Melvyn I. Marquis
Attorney, Agent, or Firm—Austin R. Miller

[57] ABSTRACT

A coating composition comprising (a) a diorganopolysiloxane having 1 to 3 functional groups on each of both ends, (b) a diorganopolysiloxane having no functional group or having 1 to 3 functional groups on one end, and (c) a cross-linking agent having two or more functional groups capable of undergoing condensation or addition reaction with the functional groups is coated together with a solvent onto a printing plate or a printing part. The coating composition is ink-repellent and prevents an area to which ink is not to be applied from staining with ink by being coated onto the area.

11 Claims, No Drawings

COATING COMPOSITION AND THE USE THEREOF

BACKGROUND OF THE INVENTION

1. Field of the Invention

The invention relates to a coating composition and the use thereof, particularly for the field of printing.

2. Description of the Prior Art

It is often necessary to temporarily or semipermanently protect the surface of an article from staining. For example, when applying a coating fluid such as paint, it is necessary to prevent staining of the back surface, to cover parts to which the coating fluid is not to be applied, or to prevent staining of the end portion of a backing roll. Such surface protection is particularly important in the field of printing, which is a type of imagewise coating process.

In various types of printing such as letterpress, lithography, intaglio, screen printing, and collotype, there have been serious problems in that the ink is undesirably applied to the non-image area of a printing plate during printing and, as a result, the resultant printing has staining or spreading of the image. For example, letterpress or flexography, there may occur a problem in that ink is applied to the non-image area of a printing plate. In the case of printing with the use of a metal mask as described in Japanese Unexamined Patent Publication (Kokai) No. 56-67985, printing ink flows onto the back surface of the mask (i.e., the surface to be brought into contact with an object to be printed) during the printing, producing an ink spread in the printing boundary and making the printing unclear. To solve such a problem, the non-image area of the printing plate or the back surface of the metal mask may be treated to make it ink-repellent or stain-resistant. Thus, demand has arisen for a treating agent capable of rendering such properties to the surface of the plate or mask.

Further, there has been desired a means for preventing the ink-receptive area of a printing plate from being applied with ink, i.e., a means for converting the image area of a printing plate into a non-image area, or in other words, a method of correcting the image of a printing plate. In the process for the preparation of a printing plate, an ink-receptive defect in the non-image area of the printing plate may be produced due to various causes such as defects in the mask film, damage by a film edge and the presence of dust. Therefore, a means for deleting and correcting the defect is necessary. Particularly, in a waterless planographic printing plate having an ink-repellent layer made of a silicone rubber layer, while many advantages can be obtained due to the fact that no dampening solution is necessary during printing, the silicone rubber layer may have a defect. Therefore, the correction of the defects is an important process. Further, it may become necessary to convert an image area into a non-image area by deleting the image. Such correction of the printing plate can be attained by treating the defect on the plate or the image area of the plate to render it ink-repellent.

For the purpose of preventing such staining, there has hitherto been known a method for forming a water-repellent and oil-repellent film of a fluoroplastic such as polytetrafluoroethylene or a silicone resin onto the surface of an article to be prevented from staining. However, high temperature treatment is generally necessary for the formation of such a resin film. For example, in the process for coating a silicone resin onto a surface of a metal mask for the preparation of a printed circuit as disclosed in Japanese Unexamined Patent Publication No. 56-67985, a reactive silicone oil, SH-1107 (Toray Silicone Co., Japan), is coated into the surface by a brush and then cured at 150° C. for 10 to 15 minutes. Further, in the processes for converting a presensitized printing plate into a waterless planographic printing plate, as disclosed in Japanese Examined Patent Publication (Kokoku) Nos. 50-34970 and 50-35442, a silicone composition is coated onto the surface of the presensitized printing plate and then cured at 180° C. for 5 minutes or at 200° C. for 1.5 to 2 minutes. These resins have poor adhesion to a substrate and the adhesion becomes poorer as the curing conditions become milder. It has therefore been necessary to cure them at a relatively high temperature as mentioned above. Thus, a complicated operation has been necessitated, and a severe limitation has been placed on substrates to which such resins can be applied. Therefore, it has been desired to develop a means for producing a stain-resistant, strong coating under mild conditions.

SUMMARY OF THE INVENTION

It is an object of the present invention to provide a coating composition which can produce an excellent stain-resistant coating.

It is another object of the present invention to provide a coating composition which is promptly cured at room temperature and, thus, can be applied to a non-heat-resistant substrate which cannot withstand heating or a case where heating is inconvenient in process.

It is a further object of the present invention to provide a coating composition which can produce an ink-repellent coating.

It is a still further object of the present invention to provide a method of preventing a printing plate or printing part from staining with ink by coating it with a coating composition.

It is a still further object of the present invention to provide a method of correcting an image area by coating a waterless planographic printing plate with a coating composition.

According to the present invention, there is provided a coating composition comprising essentially (a) a diorganopolysiloxane having 1 to 3 functional groups on each of both ends, (b) a diorganopolysiloxane having no only functional group or having 1 to 3 functional groups on one end, (c) a cross-linking agent having a plurality of functional groups capable of undergoing condensation or addition reaction with the functional groups, and, optionally, (d) an organometallic catalyst for said cross-linking reaction.

DESCRIPTION OF THE PREFERRED EMBODIMENTS

The diorganopolysiloxanes usable for components (a) and (b) in the present invention are compounds of general formula I,

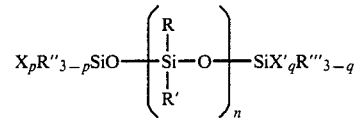

in which R, R', R", and R"' each independently represents an alkyl, alkenyl, or aryl group of 1 to 10 carbon atoms, which may optionally have suitable substituents, X and X' each independently represents a functional group selected from the group consisting of halogen,

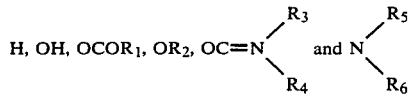

in which $R_1$, $R_2$, $R_3$, $R_4$, $R_5$, and $R_6$ each independently represents unsubstituted or substituted alkyl of 1 to 10 carbon atoms, n is a number of 100 to 10,000, and each of p and q is 0, 1, 2, or 3.

Thus, the diorganopolysiloxanes having 1 to 3 functional groups on each of both ends are compounds at formula I in which p is a integer satisfying $1 \leq p \leq 3$, and q is an integer satisfying $1 \leq q \leq 3$, while the diorganopolysiloxanes having no functional group or having 1 to 3 functional groups on one end only are compounds of formula I in which p and q are 0; p is an integer satisfying $1 \leq p \leq 3$ and q is 0; or p is 0 and q is an integer satisfying $1 \leq q \leq 3$.

In other words, the coating composition comprises the combination of diorganopolysiloxanes I and I', comprising:

(a) a diorganopolysiloxane having 1 to 3 functional groups on both ends, represented by the follow formula I,

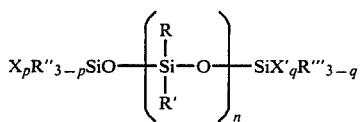

(b) a diorganopolysiloxane having 1 to 3 functional groups on only one end, represented by the following formula I':

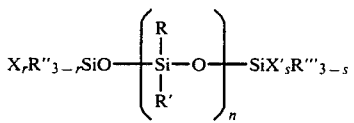

and (c) a cross-linking agent other than (a) or (b), and having two or more functional groups capable of undergoing condensation reactions with said functional groups, and represented by the formula

wherein X and R are as defined for Formula I, m is an integer of 3 or 4, or a condensate thereof, wherein in said formulas I and I' the designations R, R', R" and R'" each independently represent an alkyl, alkenyl or aryl group from 1 to 10 carbon atoms, which may optionally have suitable substituents, X and X' each independently represents a functional group selected from the group consisting of halogen,

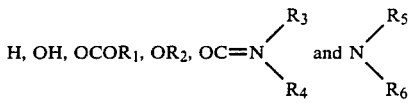

in which $R_1$, $R_2$, $R_3$, $R_4$, $R_5$, and $R_6$ each independently represents unsubstituted or substituted alkyl from 1 to 10 carbon atoms, n is a number from 100 to 10,000, p and q are independently integers from 1 to 3, r and s are integers from 0 to 3, wherein one of r and is is 0, and r is an integer from 1 to 3 when s is 0, and when r is 0 s is an integer from 1 to 3.

In the compounds of general formula I, R, R', R", and R'" may be the same or different, and the recurring units may be different from each other along the polymer chain. In general, it is desirable that not less than 60% of R and R' be methyl and not more than 40% of R and R' be vinyl and/or phenyl. X and X' may be the same or different. The diorganopolysiloxanes as each of components (a) and (b) may be employed alone or as a mixture of two or more thereof.

The cross-linking agent usable for component (c) may be a silicon compound having a plurality of, functional groups preferably not less than 3, capable of undergoing condensation or addition reaction with the functional groups X and/or X' in the compounds of formula I (or functional groups newly produced from the functional groups, e.g., by hydrolysis). Particularly, a compound of formula II, $$X_m SiR_{4-m} \qquad \text{II}$$

in which X and R are as defined above for formula I, and m is an integer satisfying $2 \leq m \leq 4$, or a condensate thereof is preferred. The cross-linking agents may be employed alone or as a mixture of two or more thereof.

The organometallic catalyst usable for component (d) is a substance for accelerating the condensation or addition reaction of the functional groups in the (a) and (b) components with the functional groups in component (c) and may include organic carboxylic acid salts of metals such as tin, zinc, and lead, for example, dibutyltin diacetate, dibutyltin dilaurate, tin octoate, zinc octoate, and lead naphthenate as well as chloroplatinic acid.

The coating composition according to the present invention preferably has the following composition:

(1) 100 parts by weight of the diorganopolysiloxane component;

(2) 3 to 200 parts by weight of the cross-linking agent; and, optionally, (3) 0.05 to 50 parts by weight of the catalyst.

The above-mentioned diorganopolysiloxane component is a mixture of at least one component (a) and at least one component (b). Preferably, the weight ratio of component (a) to component (b) is in a range of from 95/5 to 10/90, particularly from 80/20 to 20/80.

The coating composition may contain various fillers for the purpose of improving the strength of the resultant film. The coating composition may also contain coloring matters such as dyestuffs or pigments for the purpose of coloring the resultant film to make it easily visible, as well as other additives.

For the formulation of the coating composition, there may advantageously be employed solvents such as paraffinic hydrocarbons, isoparaffinic hydrocarbons, cycloparaffinic hydrocarbons, aromatic hydrocarbons, alkyl carboxylate, ethers, ketones, halogenated hydrocarbons, and mixtures thereof. Solvents based on paraffinic or isoparaffinic hydrocarbons are particularly preferred from the viewpoint of coating performance. Typical hydrocarbons include petroleum fractions and modified petroleum fractions.

Preferred coating compositions may contain a linear diorganopolysiloxane having substantially 1 to 3 hydroxyl groups on each of both ends and having a number average molecular weight of 5,000 to 1,000,000 as component (a), a linear diorganopolysiloxane having substantially 1 to 3 hydroxyl groups on one end or having substantially no functional group and having a number average molecular weight of 5,000 to 1,000,000 as component (b), and a polyacetoxysilane of the following formula III,

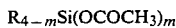    III in which R is as defined above, and m is 3 or 4, or a condensate thereof as component (c). Such compositions exhibit a good curability, adhesion, and shelf stability in a solution. When such a coating composition is used, a cured film can be obtained with the use of no catalyst. However, it is preferred that a catalyst be used for the purpose of accelerating the curing of the composition and improving the adhesion of the cured film. As such a catalyst, tin compounds such as dibutyltin diacetate, dibutyltin dilaurate, and tin octoate may particularly preferably be employed.

As the linear diorganopolysiloxanes having substantially no functional group for component (b), there may be employed commercially available products such as SH-200 (Toray Silicone Co., Japan) and KF-96H (Shinetsu Chemical Co., Japan). Among products having various viscosities, those having a relatively high viscosity of 1,000 to 100,000 cst. are preferred.

The above-mentioned preferred coating compositions may contain 100 parts by weight of the diorganopolysiloxane component, having a weight ratio of component (a) to (b) component of 95/5 to 10/90, preferably 80/20 to 20/80, 3 to 200 parts by weight, preferably 10 to 100 parts by weight, of the polyacetoxysilane of formula III or the condensate, and 0.05 to 50 parts by weight, preferably 0.1 to 30 parts by weight, of the catalyst. If the amount of the polyacetoxysilane added is too small, satisfactory adhesive strength and shelf stability in a solution may not be obtained. If the amount is too large, the resultant composition may have disadvantages in that the curing rate and stain resistance are low. If the amount of the catalyst is too small, the curing rate may be low, while if the amount is too large, the resultant coated film may have an insufficient stain resistance and a low durability in that the film is degraded with the lapse of time upon storage for a long period of time.

In the formulation of the coating composition, the suitable concentration of a solution may depend on the molecular weights of the diorganopolysiloxanes, the type of the solvent, the coating method, and the purpose of application. However, the concentration may generally be 5% to 50% by weight, preferably 10% to 30% by weight. If the concentration is too low or too high, the solution may be hard to coat and may not produce a coated film of a proper thickness.

The coating composition as mentioned above may be coated onto a desired object using various coating devices, such as a hair pencil, brush, cloth, swab, sponge, pipette, squirt, and syringe. The curing and adhesion of the coated composition may be accelerated by heating it with an appropriate heating means. Further, an appropriate material may be coated as a primer before the coating of the coating composition in order to enhance the adhesion of the coated film.

The coating composition according to the present invention may be applied to various objects of any materials. In particular, the coating composition may be broadly used in various fields in view of the fact that the composition can be applied to a non-heat-resistant substrate such as paper, fabric, or flexible resin since heating is not necessary to cure the composition.

The present invention is characterized by the use of component (b) which is a dioganopolysiloxane having no functional group or having 1 to 3 functional groups on one end. If only the polydiorganopolysiloxane of component (a) is used as the diorganopolysiloxane component, as in the prior art, although the resultant coated film has a high crosslink density and, thus, a high strength, the film has a low adhesion, so that it is easily removed from the object and the durability of the film is low. Contrary to this, the coating composition according to the present invention, which contains component (b) can produce a coated film having an unexpectedly highly improved adhesion and an extremely good durability even under mild curing conditions such as at room temperature, although the cured film may become slightly soft due to the reduced crosslink density.

The coating composition may be utilized in various fields, but the application in the printing field as mentioned hereinbefore is particularly important.

Clear printing with no stain can be obtained by coating the coating composition according to the present invention onto the non-image area of a printing plate in various types of printing. It is particularly useful to apply the composition to screen printing or to printing with the use of a metal mask. In these printing techniques, which are mainly utilized for the process of manufacturing a printed circuit, the printing ink often flows onto the reverse side surface of the plate or mask, which surface is brought into contact with an object to be printed, during the printing. This not only produces an ink spread in the printing boundary of the printing to make the printing unclear, but also produces unwanted electrical contact between patterns. This problem, however, can advantageously be prevented by applying the coating composition onto the reverse side of the printing plate.

In the printing field, the coating composition according to the present invention is particularly useful for a stop-out solution for a printing plate, especially for a waterless planographic printing plate having a non-image area of a silicone rubber layer. As already mentioned, the correction of an image area is a very important procedure in the preparation of a waterless planographic printing plate and, thus, the development of a correction means which is easy to operate and highly effective has been in great demand. This demand can easily be satisfied by the use of the coating composition according to the present invention. If the coating composition according to the present invention is coated onto an area of a waterless planographic printing plate which is to be corrected and then dried, the composition is promptly cured at room temperature to produce an ink-repellent silicone rubber layer on the coated area. Thus, if printing is carried out using the printing plate which has been so corrected, there can be obtained printing from which the unnecessary image has been completely deleted. The silicone rubber layer formed on the corrected area firmly adheres to the surface of the plate in the image area or in the non-image area and has an extremely good durability.

In offset printing, a similar effect can be attained if the coating composition is applied to an area of a blanket corresponding to the area of a printing plate to be corrected, instead of coating the composition directly onto the printing plate.

The present invention will further be illustrated with reference to the following non-limitative examples.

EXAMPLE 1

A waterless planographic plate made by Toray industries Inc. was exposed to light through a test chart and was developed to form a printing plate. Each of solution nos. 1 to 5, having various compositions as shown in Table 1, was coated onto the image area of the above printing plate and then dried at room temperature. After 1 to 2 minutes from the coating, the coated composition became dried to produce a strong cured film with no sticking. Thus, the image of the printing plate was deleted to form a non-image area. After standing for 5 minutes from the coating, the following tests were carried out.

(A) Test for Durability

The durability of the corrected area was determined by effecting printing under normal conditions using a "SPRINT" two-color printing machine made by Komori Printing Machine Co.

(B) Test for Washing Resistance

The procedure of printing after wiping the surface of the printing plate with a cloth impregnated with an isoparaffinic hydrocarbon ("Isopar E" sold by Esso Co.) was repeated, the number of operations until the cured film on the plate surface was removed and the deleted image appeared on the print was counted. A two-reciprocating wiping operation was counted as one washing cycle.

The results are shown in Table 1. From the results, it is proved that if the coating composition according to the present invention is applied onto a printing plate to form a silicone rubber film, the image of the printing plate is completely deleted from the print and the silicone rubber film on the printing plate has a good durability.

TABLE 1

| Solution No. | Composition (Parts by weight) | | | | | | | | Durability (number of prints) | Washing resistance (number of washings) |
| --- | --- | --- | --- | --- | --- | --- | --- | --- | --- | --- |
| | A | B | C | D | E | F | G | H | | |
| 1 | 80 | 20 | — | 20 | — | 2 | 420 | 70 | 70,000 | 15 |
| 2 | 60 | 40 | — | 20 | — | 2 | 420 | 70 | >100,000 | >20 |
| 3 | 60 | 40 | — | 20 | 1.5 | 1 | 420 | 70 | >100,000 | >20 |
| 4 | 60 | — | 40 | 20 | — | 2 | 420 | 70 | >100,000 | >20 |
| 5 | 40 | — | 60 | 20 | 2 | 1 | 420 | 70 | >100,000 | 20 |
| Comparative | 100 | — | — | 20 | — | 2 | 420 | 70 | 30,000 | 5 |

In Table 1,

A is a dimethylpolysiloxane having one hydroxyl group on each of both ends and having a number average molecular weight of 22,000;

B is a dimethylpolysiloxane having one hydroxyl group on one end and having a number average molecular weight of 20,000;

C is SH-200 (a dimethylpolysiloxane sold by Toray Silicone Co.) having a viscosity of 100,000 cst.;

D is methyltriacetoxysilane;

E is tetraacetoxysilane;

F is dibutyltin diacetate;

G is "Isopar E" (an isoparaffinic hydrocarbon mixture having a boiling range from 116° C. to 146° C., sold by Esso Co.); and H is n-butyl acetate.

EXAMPLE 2

A screen plate made by coating a photosensitive resin mixture consisting of polyvinyl alcohol and a diazo resin onto a polyester screen was exposed to light through a printed circuit pattern and developed to form a printing plate. Onto the whole reverse side surface of the printing plate (i.e., the surface to be brought into contact with an object to be printed), the solution No. 1 as mentioned in Example 1 was coated using a brush. Then, the front surface of the printing plate (i.e., the surface onto which the solution was not coated) was lightly wiped with a gauze impregnated with "Isopar E" to clear out the solution onto the image area (i.e., the open area of the screen). And finally, the printing plate was dried at room temperature for about 2 hours. Using the printing plate treated as above, printing was carried out using a conventional screen printing machine. The resultant printing was very clear having no spread of the image or stain in the non-image area.

In the case where the printing plate was not treated with the above-mentioned coating composition, the resultant printing was less clear and had a slight spread of the image and stain in the non-image area.

We claim:

1. A coating composition comprising the combination of (a) a diorganopolysiloxane having 1 to 3 functional groups on both ends, represented by the following formula I,

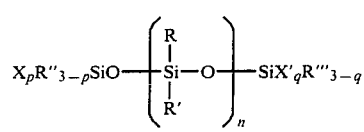

(b) a diorganopolysiloxane having 1 to 3 functional groups on only one end, represented by the following formula I',

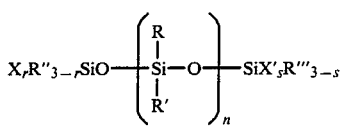

and (c) a cross-linking agent other than (a) or (b), and having two or more functional groups capable of undergoing condensation reactions with said functional groups, and represented by the formula $X_mS_iR_{4-m}$, wherein X and R are as defined for Formula I, m is an integer of 2 to 4, or a condensate thereof, wherein in said formulas I and I' the designations R, R', R" and R'" each independently represent an alkyl, alkenyl or aryl group from 1 to 10 carbon atoms, which may optionally have suitable substituents, X and X' each independently represents a functional group selected from the group consisting of halogen,

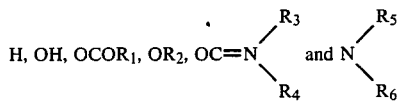

in which $R_1$, $R_2$, $R_3$, $R_4$, $R_5$, and $R_6$ each independently represents unsubstituted or substituted alkyl from 1 to 10 carbon atoms, n is a number from 100 to 10,000, p and q are independently integers from 1 to 3, r and s are integers from 0 to 3, wherein one of r and s is 0, and r is an integer from 1 to 3 when s is 0, and when r is 0 s is an integer from 1 to 3.

2. A coating composition as claimed in claim 1, further comprising an organometallic catalyst (d).

3. A coating composition as claimed in claim 2, wherein the organometallic catalyst (d) is a tin compound.

4. A coating composition as claimed in claim 2, comprising the diorganopolysiloxanes (I) and (I') in an amount of 100 parts by weight, the cross-linking agent (c) in an amount of 3 to 200 parts by weight, and the organometallic catalyst (d) in an amount of 0.05 to 50 parts by weight.

5. A coating composition as claimed in claim 1, further comprising an organic solvent (e).

6. A coating composition as claimed in claim 5, wherein the concentration of the solute is from 5% to 50% by weight based on the weight of the composition.

7. A coating composition as claimed in claim 1, wherein the cross-linking agent is a compound represented by the following formula II, $X_mSiR_{4-m}$ in which X and R are as defined in claim 1, and m is an integer of 3 to 4.

8. A coating composition as claimed in claim 7, wherein X is $OCOCH_3$ and m is 3 or 4.

9. A coating composition as claimed in claim 1, wherein the weight ratio of the diorganopolysiloxane (I) to the diorganopolysiloxane (I') is in a range of from 95/5 to 10/90.

10. A coating composition as claimed in claim 1, wherein X and X' are OH.

11. A coating composition as claimed in claim 1, wherein the diorganopolysiloxanes (I) and (I') are linear ones.

* * * * *